(12) United States Patent
Zhu

(10) Patent No.: US 11,057,475 B2
(45) Date of Patent: Jul. 6, 2021

(54) METHODS, APPARATUS AND SYSTEMS FOR RESUMING TRANSMISSION LINK

(71) Applicant: CloudMinds (Shanghai) Robotics Co., Ltd., Shanghai (CN)

(72) Inventor: Lei Zhu, Shenzhen (CN)

(73) Assignee: CLOUDMINDS (SHANGHAI) ROBOTICS CO., LTD., Shanghai (CN)

( * ) Notice: Subject to any disclaimer, the term of this patent is extended or adjusted under 35 U.S.C. 154(b) by 0 days.

(21) Appl. No.: 16/474,493

(22) PCT Filed: Dec. 27, 2016

(86) PCT No.: PCT/CN2016/112400
§ 371 (c)(1),
(2) Date: Jun. 27, 2019

(87) PCT Pub. No.: WO2018/119677
PCT Pub. Date: Jul. 5, 2018

(65) Prior Publication Data
US 2019/0349436 A1    Nov. 14, 2019

(51) Int. Cl.
*G06F 15/173* (2006.01)
*H04L 29/08* (2006.01)
*H04L 29/06* (2006.01)

(52) U.S. Cl.
CPC .......... *H04L 67/141* (2013.01); *H04L 67/06* (2013.01); *H04L 67/1002* (2013.01); *H04L 67/2842* (2013.01); *H04L 67/42* (2013.01)

(58) Field of Classification Search
CPC ... H04L 67/141; H04L 67/06; H04L 67/1002; H04L 67/2842; H04L 67/42;
(Continued)

(56) References Cited

U.S. PATENT DOCUMENTS

| 6,175,869 B1 * | 1/2001 | Ahuja ................ H04L 67/1008 709/203 |
| 6,643,693 B1 * | 11/2003 | Reynolds ................ H04L 12/28 709/221 |

(Continued)

FOREIGN PATENT DOCUMENTS

| CN | 102761614 A | 10/2012 |
| CN | 103918304 A | 7/2014 |
| CN | 104320490 A | 1/2015 |

OTHER PUBLICATIONS

ISA State Intellectual Property Office of the People's Republic of China, International Search Report Issued in Application No. PCT/CN2016/112400, dated Sep. 22, 2017, WIPO, 4 pages.
(Continued)

*Primary Examiner* — Thuong Nguyen
(74) *Attorney, Agent, or Firm* — McCoy Russell LLP

(57) ABSTRACT

Disclosed are methods, systems and apparatus for resuming a transmission link. The method may comprise: if a connection between a first server and a third server that are adjacent to each other in a transmission link is interrupted, a second server serving as a next node of the third server sends a breakpoint resuming request to the first server; on the condition that the first server and the second server mutually determine that the resuming condition between the two is satisfied, the first server establishes a compensation connection egress port of the first server to an ingress port of the second server; and resumption is performed through the compensation connection. The abnormal connection in the transmission link can be compensated and resumed through a node in a private network, so that the idle processing capacity of each node can be utilized, and the utilization rate of processing resources can be improved.

20 Claims, 7 Drawing Sheets

(58) Field of Classification Search
CPC . H04L 67/142; H04L 67/148; H04L 67/1078; H04L 67/143
USPC ....... 709/213, 226, 223, 201, 206, 214, 203, 709/224; 370/403, 328, 228, 229, 253, 370/230
See application file for complete search history.

(56) References Cited

U.S. PATENT DOCUMENTS

| | | | | |
|---|---|---|---|---|
| 2005/0138605 A1* | 6/2005 | Yamamoto | ............ | G06F 11/362 717/135 |
| 2007/0076536 A1* | 4/2007 | Shimizu | ............. | G11B 7/00458 369/30.23 |
| 2009/0016268 A1* | 1/2009 | Yi | ...................... | H04W 56/001 370/328 |
| 2009/0240766 A1* | 9/2009 | Kikkawa | ................ | H04L 49/90 709/203 |
| 2009/0245102 A1* | 10/2009 | Feng | ....................... | H04L 69/40 370/228 |
| 2010/0014420 A1* | 1/2010 | Wang | .................... | H04L 41/142 370/229 |
| 2010/0104282 A1* | 4/2010 | Khan | ........................ | H04J 3/14 398/45 |
| 2010/0138612 A1* | 6/2010 | Wei | ....................... | G06F 12/084 711/130 |
| 2010/0199131 A1* | 8/2010 | Yoshida | ................ | G06F 11/008 714/54 |
| 2011/0131108 A1* | 6/2011 | Doxey | ............... | G06Q 30/0601 705/26.1 |
| 2012/0005251 A1* | 1/2012 | Xie | ....................... | H04L 67/288 709/201 |
| 2012/0084369 A1* | 4/2012 | Henriquez | .............. | H04L 67/08 709/206 |
| 2012/0124009 A1* | 5/2012 | Eshel | .................... | G06F 16/125 707/689 |
| 2012/0314581 A1* | 12/2012 | Rajamanickam | ... | H04L 41/0826 370/238 |
| 2015/0092591 A1* | 4/2015 | Matthews | ............. | H04L 43/062 370/253 |
| 2015/0229587 A1* | 8/2015 | Ma | ...................... | H04L 49/3009 370/419 |
| 2015/0331794 A1* | 11/2015 | Ren | ..................... | G06F 12/0833 709/214 |
| 2015/0341428 A1* | 11/2015 | Chauhan | ............. | H04L 12/6418 709/203 |
| 2016/0080210 A1* | 3/2016 | Lai | ........................ | G06F 13/382 709/224 |
| 2016/0112327 A1* | 4/2016 | Morris | .................. | H04L 45/125 398/45 |
| 2016/0182329 A1* | 6/2016 | Armolavicius | ..... | H04L 41/0893 370/230 |
| 2017/0060499 A1* | 3/2017 | Sakata | ............... | H04N 1/00002 |
| 2017/0068628 A1* | 3/2017 | Calciu | ................ | G06F 13/4022 |
| 2017/0103140 A1* | 4/2017 | Zhang | ..................... | G06F 40/14 |
| 2017/0163724 A1* | 6/2017 | Puri | .................... | H04L 67/2842 |
| 2018/0084710 A1* | 3/2018 | Lawson | ............... | A01B 69/008 |
| 2019/0349436 A1* | 11/2019 | Zhu | ..................... | H04L 67/2842 |

OTHER PUBLICATIONS

International Bureau of WIPO, International Preliminary Report on Patentability Issued in Application No. PCT/CN2016/112400, dated Jul. 11, 2019, WIPO, 7 pages.

* cited by examiner

METHODS, APPARATUS AND SYSTEMS FOR RESUMING TRANSMISSION LINK

CROSS-REFERENCE TO RELATED APPLICATIONS

The present application is a U.S. National Phase of International Patent Application Serial No. PCT/CN2016/112400 entitled "METHODS, APPARATUS AND SYSTEMS FOR RESUMING TRANSMISSION LINK," filed on Dec. 27, 2016. The entire contents of each of the above-referenced applications are hereby incorporated by reference for all purposes.

TECHNICAL FIELD

FIELD OF THE INVENTION

The present disclosure relates to the field of network technology, and in particular to methods, apparatus and systems for resuming a transmission link.

BACKGROUND AND SUMMARY

BACKGROUND OF THE INVENTION

ADN (Application Delivery Networking) is an upgrade or extension of conventional network load balance, and is a comprehensive delivery platform device that integrates general platforms of various technical means such as load balance, TCP (Transmission Control Protocol) optimization management, link management, SSL (Secure Sockets Layer), VPN (Virtual Private Network), compression and optimization, intelligent network address translation, advanced routing, and intelligent port mirroring.

The ADN can be interpreted as delivery of a key application of an enterprise to a network in the literal sense of "Application Delivery Networking", that is, connection of a key application to an infrastructure by integrating a variety of "application switching" technologies on the $7^{th}$ to $7^{th}$ layers. This is equivalent to an upgrade to the conventional optimization means, from a simple single solution focusing on load balance to a series of comprehensive and edge-to-core optimization solutions nowadays. The ADN can ensure that user's service application can be quickly, securely and reliably delivered to internal employees and external service groups by using corresponding network optimization and/or acceleration devices. Advanced ADN network solutions that companies are increasingly relying on can ensure adequate IT flexibility in today's fast-changing business environment by providing adjustable security, high availability and optimization on extensible ADN platforms.

Currently, in the existing ADN network, N hops may occur from a client to a source station server (or from a source station server to a client), that is, N servers may exist between the client and the source station server, so abnormal disconnection of any segment of in a transmission link due to connection timeout or other reasons during transmission would cause other connection cascades disconnected. Thus, from the perspective of the client or the source station, the current connection is abnormally disconnected. If an on-line game is played, the game is dropped. If a video conference is held, the video is dropped, and all need to be reconnected.

The current ADN network is usually based on centralized control, which means that each node (server) in the entire ADN network is controlled by a control center of the ADN network. When the transmission link of the ADN network has a fault, the relevant node that has the fault usually reports the fault to the control center for processing, so the processing capacity of the single node in the transmission link is not fully utilized, resulting in waste of resources.

SUMMARY OF THE INVENTION

In order to solve the above technical problems, the present disclosure provides methods, apparatus and systems for resuming a transmission link.

In order to achieve the above objective, according to a first aspect of embodiments of the present disclosure, the present disclosure provides a method for resuming a transmission link, the method including:

the first server receiving a breakpoint resuming request sent by a second server if a first server is disconnected from a third server in a transmission link, the breakpoint resuming request including status information of a transfer cache of the second server and an ingress port of the second server, the third server being a server between the first server and the second server;

the first server sending a breakpoint resuming response to the second server on condition that the first server determines that the resuming condition is satisfied according to the status information of a transfer cache of the first server and the status information of the transfer cache of the second server, the breakpoint resuming response including the status information of the transfer cache of the first server and an egress port of the first server;

the second server sending a resumable response message to the first server on condition that the second server determines that the resuming condition is satisfied according to the status information of the transfer cache of the second server and the status information of the transfer cache of the first server;

the first server establishing a compensation connection with the second server from the egress port of the first server to the ingress port of the second server in response to the resumable response message; and the first server and the second server performing resumption through the compensation connection.

Optionally, the method further includes: the second server receiving a breakpoint resuming request sent by the first server if the third server is disconnected from the second server, the breakpoint resuming request including the status information of the transfer cache of the first server and the egress port of the first server;

the second server sending a breakpoint resuming response to the first server on condition that the second server determines that the resuming condition is satisfied according to the status information of the transfer cache of the second server and the status information of the transfer cache of the first server, the breakpoint resuming response including the status information of the transfer cache of the second server and the ingress port of the second server;

the first server sending a resumable response message to the second server on condition that the first server determines that the resuming condition is satisfied according to the status information of the transfer cache of the first server and the status information of the transfer cache of the second server;

the first server establishing a compensation connection with the second server from the egress port of the first server to the ingress port of the second server; and the first server and the second server performing resumption through the compensation connection.

According to a second aspect of the embodiments of the present disclosure, the present disclosure provides a system for resuming a transmission link, the system including a first server, a second server, and a third server between the first server and the second server, wherein the first server, the second server, and the third server are any three consecutive servers in a transmission link;

the first server is configured to receive a breakpoint resuming request sent by the second server if the first server is disconnected from the third server, the breakpoint resuming request including status information of a transfer cache of the second server and an ingress port of the second server;

the first server is configured to send a breakpoint resuming response to the second server on condition that the first server determines that the resuming condition is satisfied according to the status information of a transfer cache of the first server and the status information of the transfer cache of the second server, the breakpoint resuming response including the status information of the transfer cache of the first server and an egress port of the first server;

the second server is configured to send a resumable response message to the first server on condition that the second server determines that the resuming condition is satisfied according to the status information of the transfer cache of the second server and the status information of the transfer cache of the first server;

the first server is configured to establish, in response to the resumable response message, a compensation connection with the second server from the egress port of the first server to the ingress port of the second server; and the first server and the second server are configured to perform resumption through the compensation connection.

Optionally, the system further includes: the second server, configured to receive a breakpoint resuming request sent by the first server if the third server is disconnected from the second server, the breakpoint resuming request including the status information of the transfer cache of the first server and the egress port of the first server;

the second server, configured to send a breakpoint resuming response to the first server on condition that the second server determines that the resuming condition is satisfied according to the status information of the transfer cache of the second server and the status information of the transfer cache of the first server, the breakpoint resuming response including the status information of the transfer cache of the second server and the ingress port of the second server;

the first server, configured to send a resumable response message to the second server on condition that the first server determines that the resuming condition is satisfied according to the status information of the transfer cache of the first server and the status information of the transfer cache of the second server;

the first server, configured to establish a compensation connection with the second server from the egress port of the first server to the ingress port of the second server; and both the first server and the second server, configured to perform resumption through the compensation connection.

According to a third aspect of the embodiments of the present disclosure, the present disclosure provides an apparatus for resuming a transmission link, applied to a first server, the apparatus including:

a receiving module, configured to receive, if the first server is disconnected from a third server in a transmission link, a breakpoint resuming request sent by a second server, the breakpoint resuming request including status information of a transfer cache of the second server and port information of the second server;

a sending module, configured to send, on condition that the resuming condition is determined to be satisfied according to the status information of a transfer cache of the first server and the status information of the transfer cache of the second server, a breakpoint resuming response to the second server, the breakpoint resuming response including the status information of the transfer cache of the first server and port information of the first server;

wherein the receiving module is further configured to receive a resumable response message from the second server, the response message being sent when the second server determines that the resuming condition is satisfied according to the status information of the transfer cache of the second server and the status information of the transfer cache of the first server;

a connection establishment module, configured to establish a compensation connection between the first server and the second server; and a resuming module, configured to perform resumption with the second server through the compensation connection.

Based on the above, in the methods for resuming a transmission link according to the present disclosure, when the middle server in three consecutive servers is disconnected from any one of the remaining two servers, one of the remaining two servers disconnected may request the other one for resuming, and when the remaining two servers mutually determine that the resuming condition between the two is satisfied, the two servers establish a compensation connection and perform resumption through the compensation connection. The present disclosure can solve the problem that the processing capacity of a single node is not fully utilized in a private network due to the fact that breakpoint resumption can only be completed by a control center, and can compensate and resume the abnormal connection in the transmission link through a node in the private network, so that the idle processing capacity of each node can be utilized, and the utilization rate of processing resources can be improved.

Other features and advantages of the present disclosure will be described in detail in the following specific embodiments.

BRIEF DESCRIPTION OF THE FIGURES

BRIEF DESCRIPTION OF THE DRAWINGS

Figure 1:
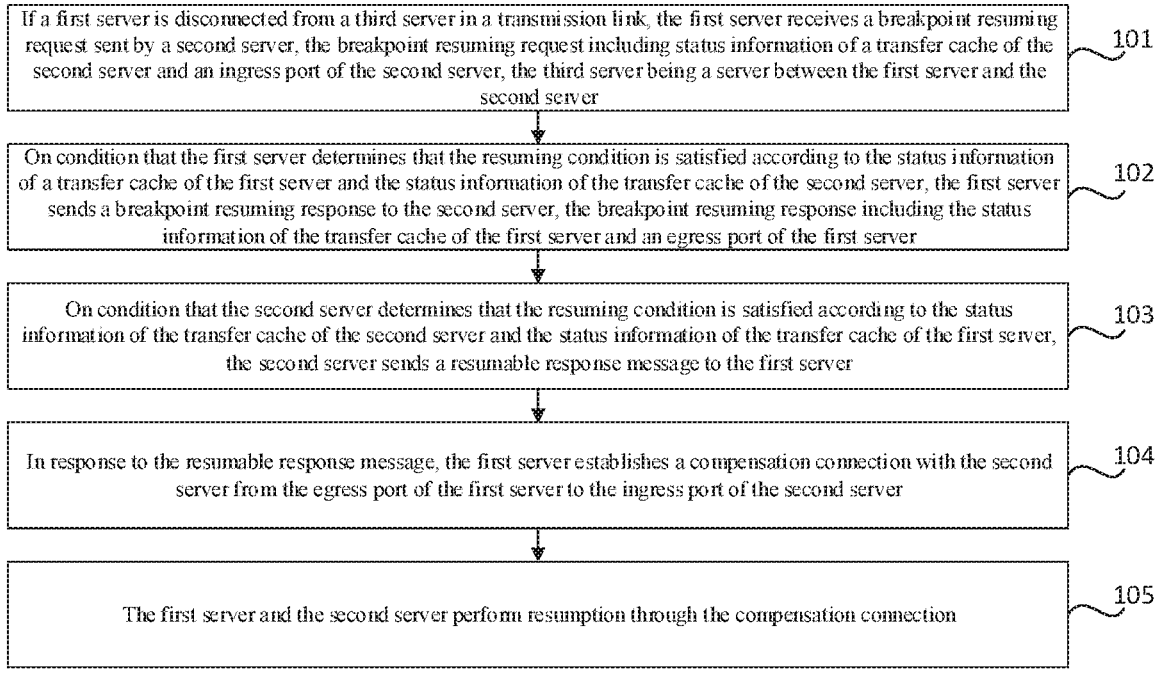
Figure 2:
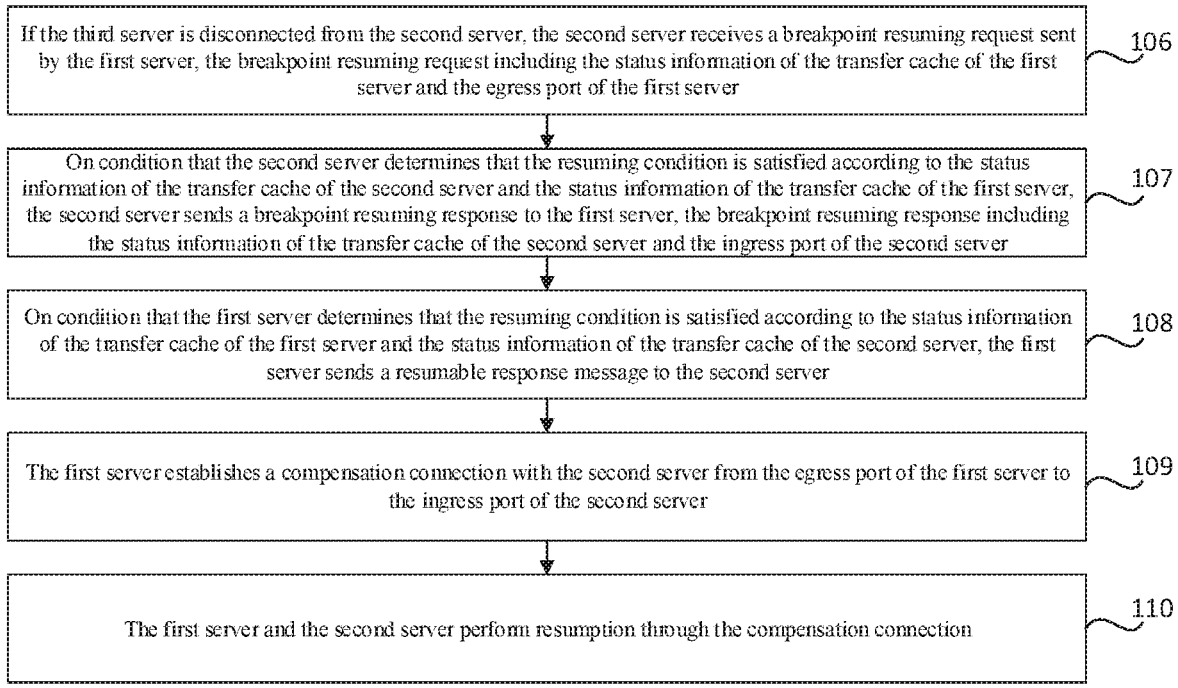
Figure 3:
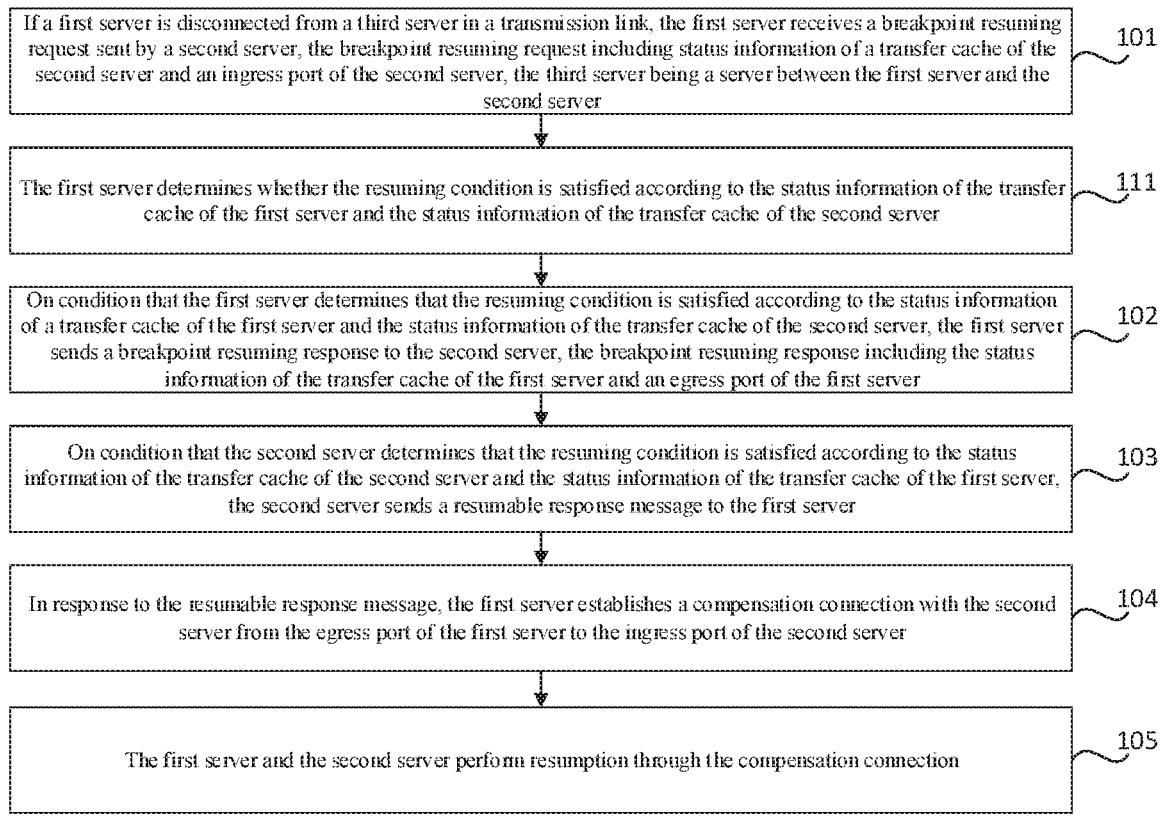
Figure 4:
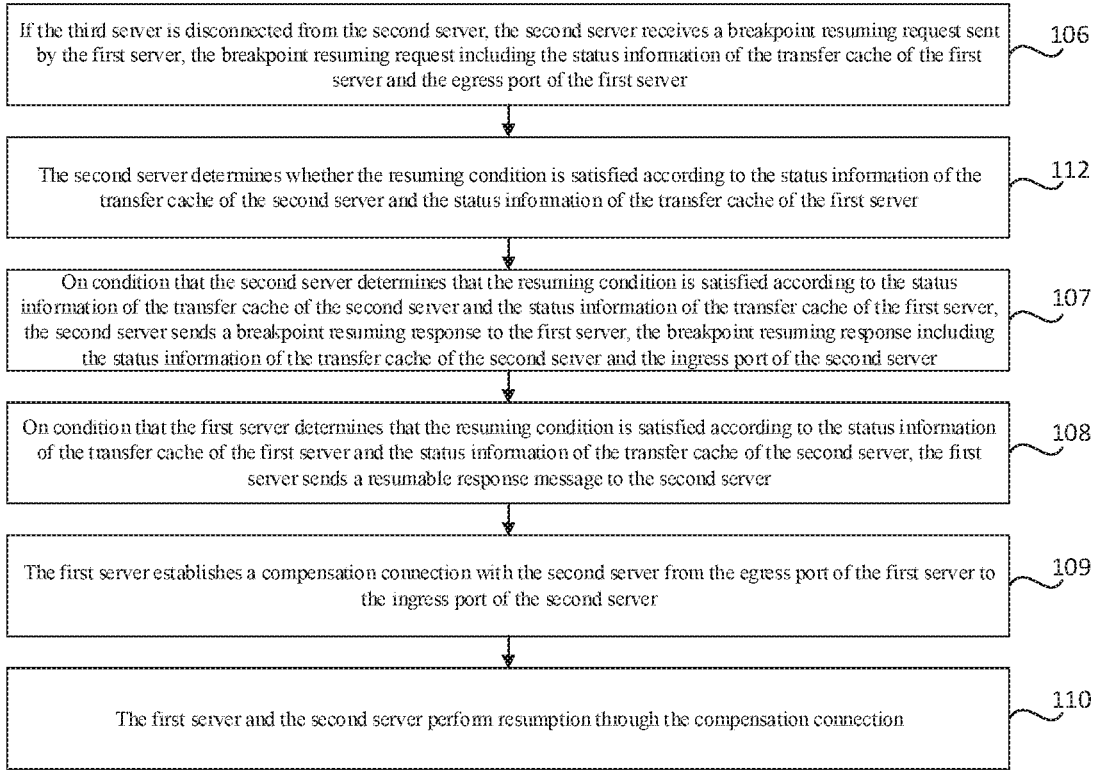
Figure 5:
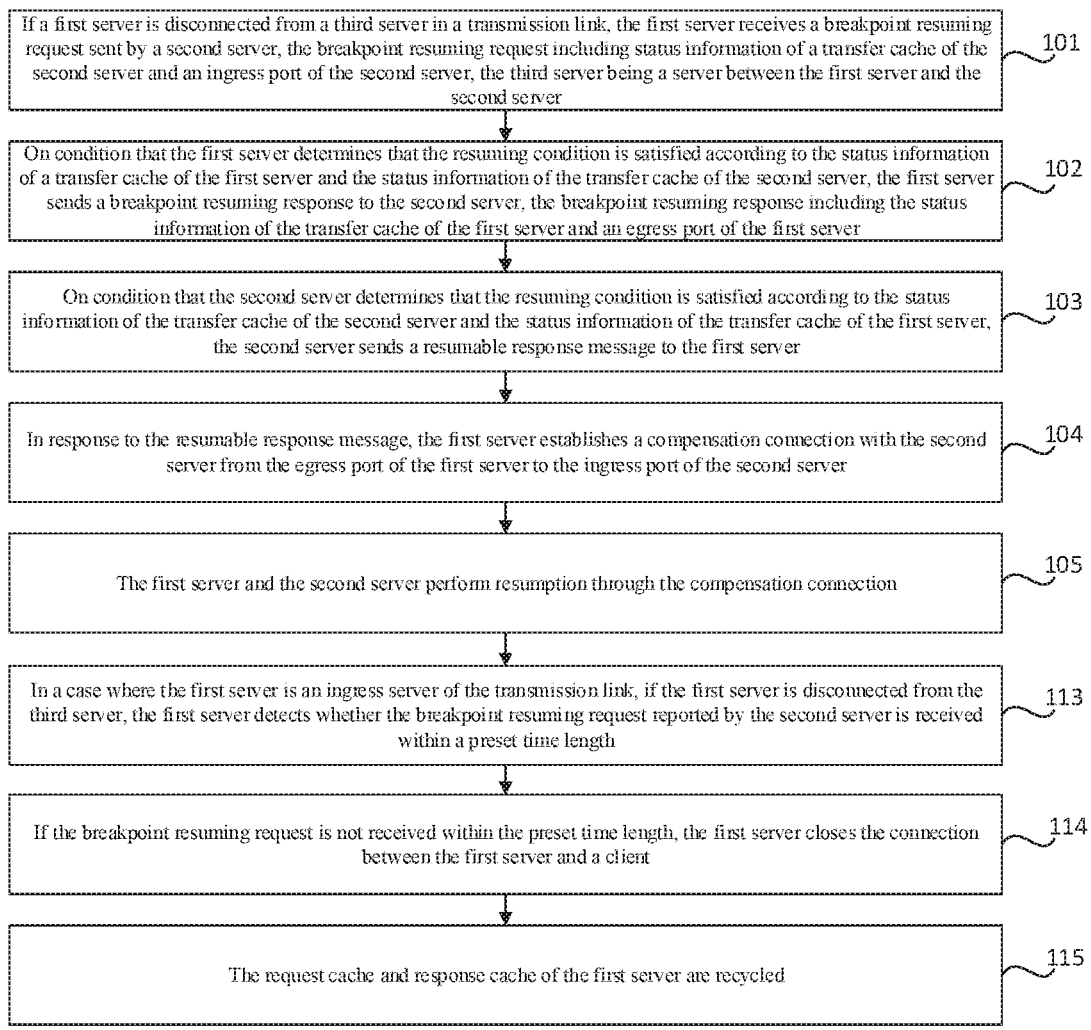
Figure 6:
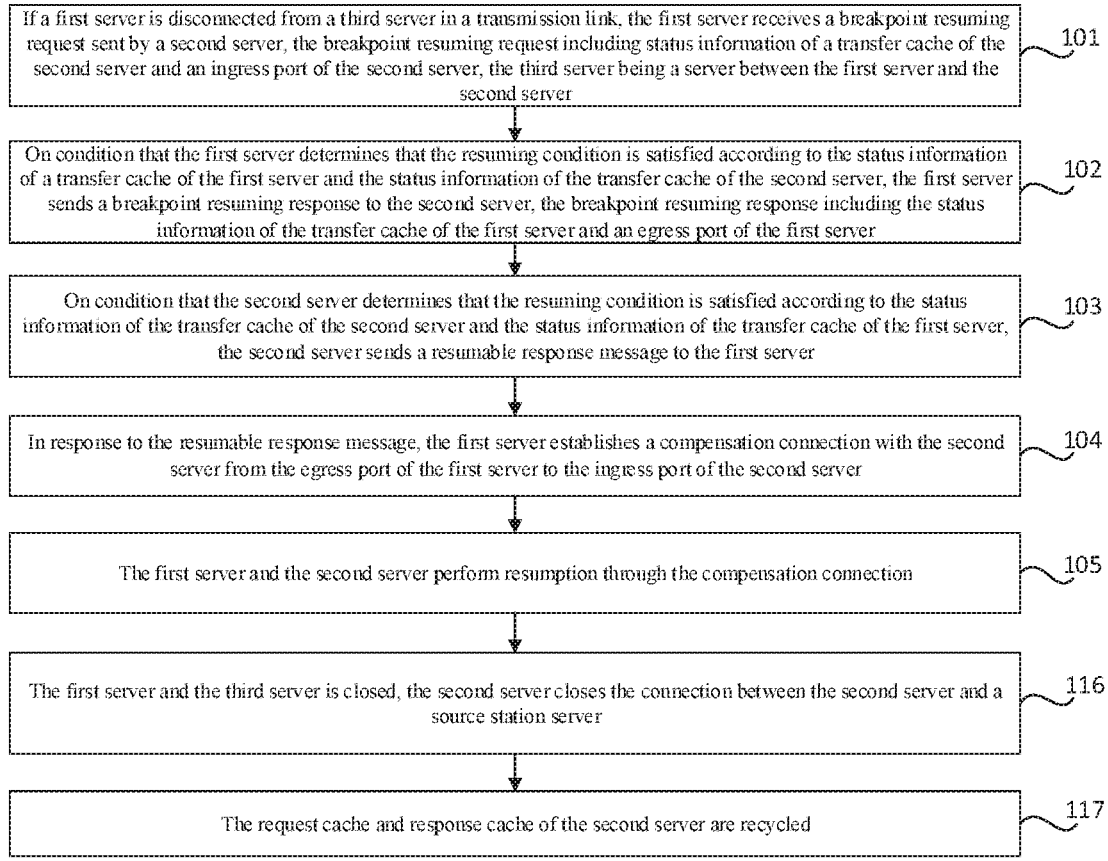
Figure 7:
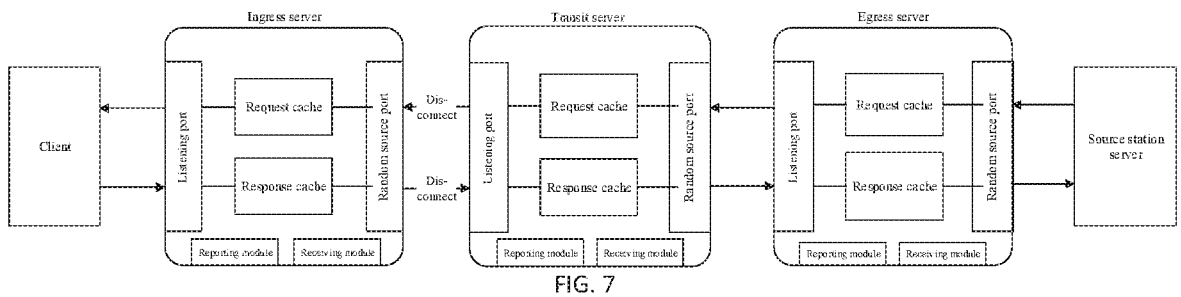
Figure 8:
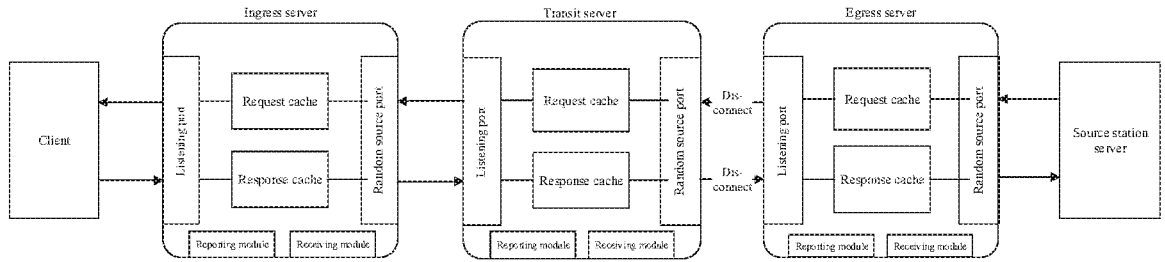
Figure 9:
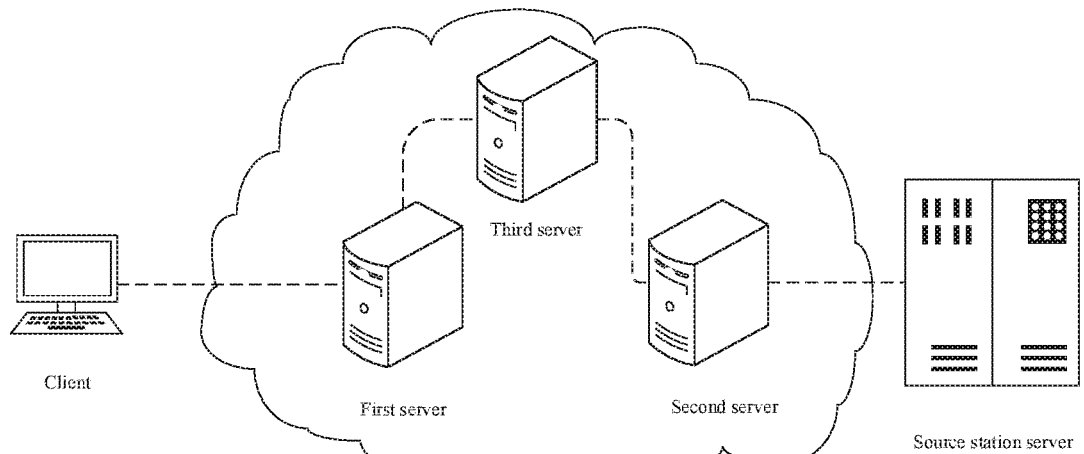
Figure 10:
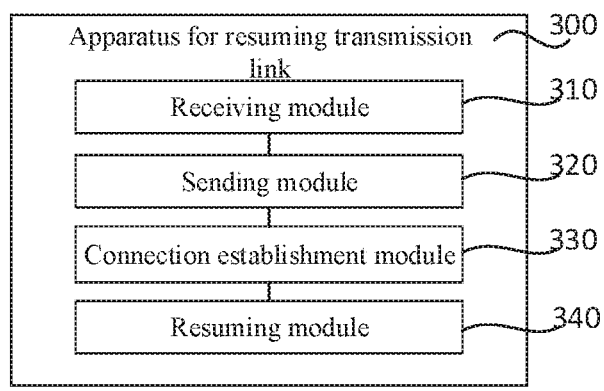
Figure 11:
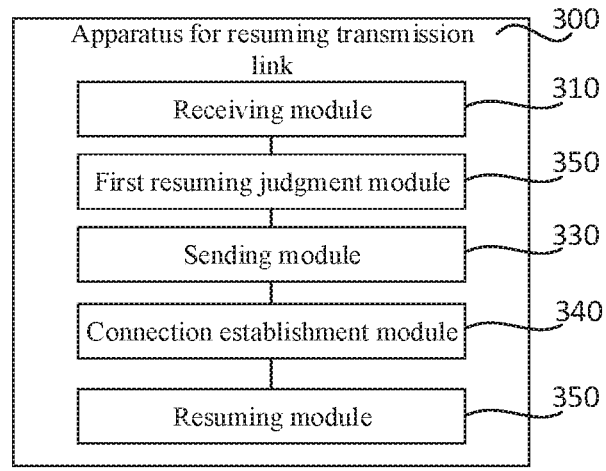
Figure 12:
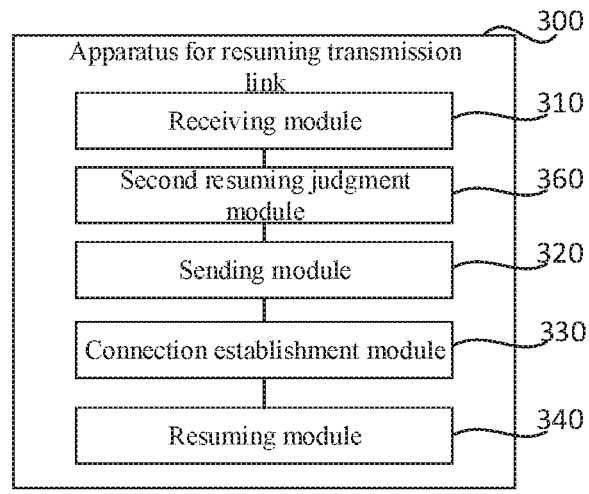
Figure 13:
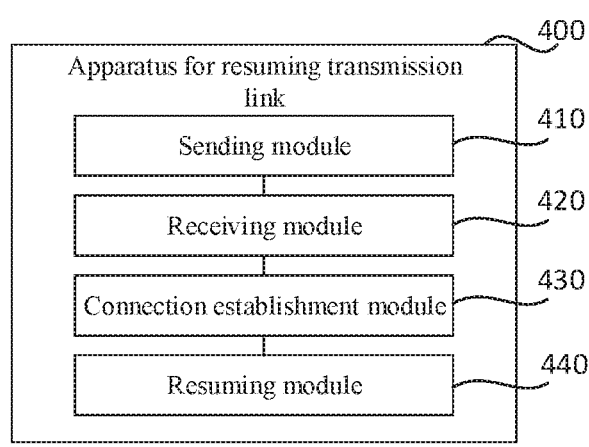
Figure 14:
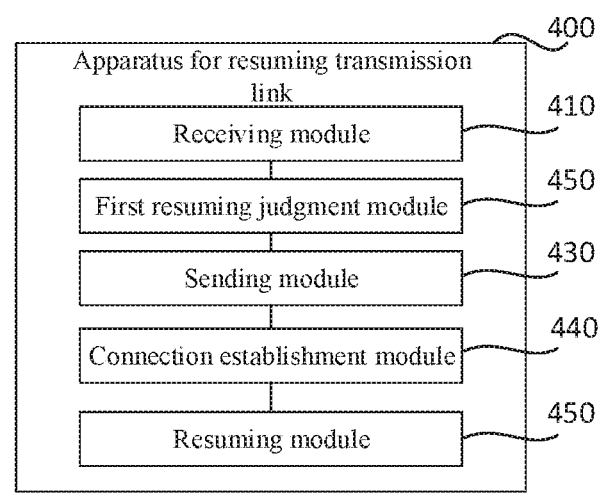
Figure 15:
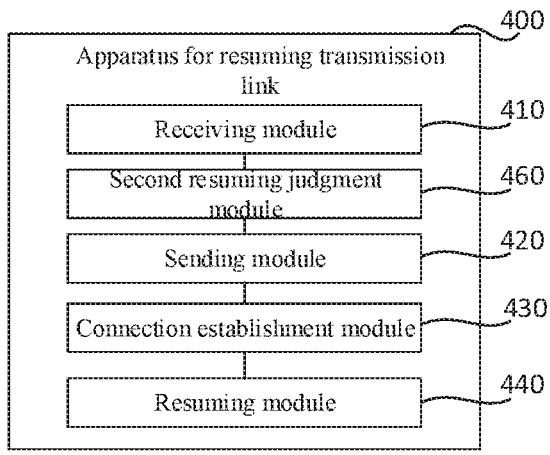
Figure 16:
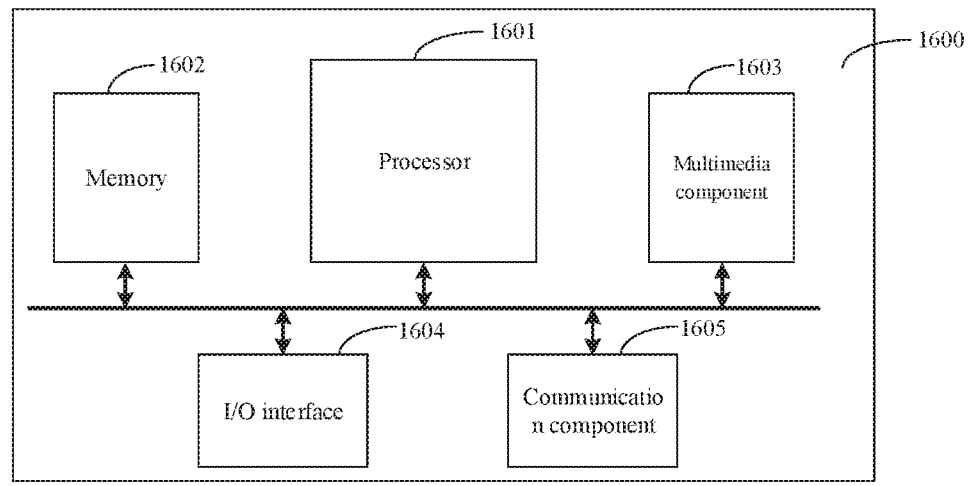
Figure 17:
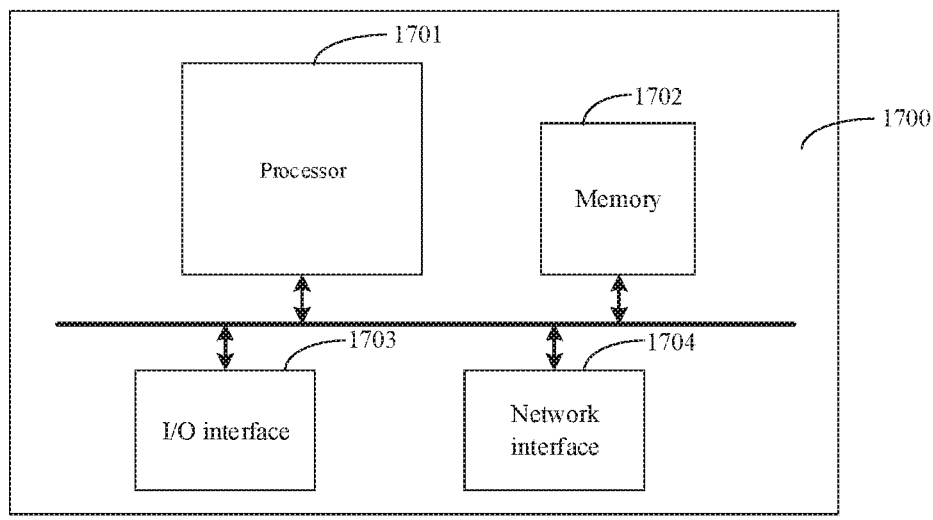

The accompanying drawings are intended to provide a further understanding of the present disclosure, constitute a part of the description, and are used for interpreting the present disclosure together with the following specific embodiments, rather than limiting the present disclosure. In the drawings:

FIG. 1 is a flow diagram of a method for resuming a transmission link according to an exemplary embodiment;

FIG. 2 is a flow diagram of another method for resuming a transmission link according to an exemplary embodiment;

FIG. 3 is a flow diagram of a method for resuming a transmission link according to another exemplary embodiment;

FIG. 4 is a flow diagram of another method for resuming a transmission link according to an exemplary embodiment;

FIG. 5 is a flow diagram of a method for resuming a transmission link according to another exemplary embodiment;

FIG. 6 is a flow diagram of another method for resuming a transmission link according to an exemplary embodiment;

FIG. 7 is a schematic diagram of a method for resuming a transmission link according to an exemplary embodiment;

FIG. 8 is a schematic diagram of another method for resuming a transmission link according to an exemplary embodiment;

FIG. 9 is a schematic diagram of a system for resuming a transmission link according to an exemplary embodiment;

FIG. 10 is a block diagram of an apparatus for resuming a transmission link according to another exemplary embodiment;

FIG. 11 is a block diagram of another apparatus for resuming a transmission link according to an exemplary embodiment;

FIG. 12 is a block diagram of a further apparatus for resuming a transmission link according to an exemplary embodiment;

FIG. 13 is a block diagram of an apparatus for resuming a transmission link according to another exemplary embodiment;

FIG. 14 is a block diagram of another apparatus for resuming a transmission link according to an exemplary embodiment;

FIG. 15 is a block diagram of a further apparatus for resuming a transmission link according to an exemplary embodiment;

FIG. 16 is a block diagram of an apparatus for resuming a transmission link according to an embodiment of the present disclosure;

FIG. 17 is a block diagram of another apparatus for resuming a transmission link according to an embodiment of the present disclosure.

DETAILED DESCRIPTION

DETAILED DESCRIPTION OF THE EMBODIMENTS

The specific embodiments of the present disclosure will be described in detail below with reference to the accompanying drawings. It should be understood that the specific embodiments described herein are merely used for illustrating and interpreting the present disclosure, rather than limiting the present disclosure.

Before a method for resuming a transmission link according the present disclosure is introduced, an application scenario of the present disclosure is first introduced. The application scenario may include a private network, and the private network may be an application delivery network between a client and a source station server, e.g., an ADN network. The private network includes at least three nodes, each of which may be a proxy server. These proxy servers may be classified as an ingress server, an egress server, and a transit server according to their locations in the transmission network. The proxy servers may be the servers that support network connection requests, caching, response, and port listening.

FIG. 1 is a flow diagram of a method for resuming a transmission link according to an exemplary embodiment. As shown in FIG. 1, the method for resuming a transmission link may include the following steps.

Step 101, if a first server is disconnected from a third server in a transmission link, the first server receives a breakpoint resuming request sent by a second server, the breakpoint resuming request including status information of a transfer cache of the second server and an ingress port of the second server, the third server being a server between the first server and the second server.

Taking the private network as an example for an ADN network, each proxy server in the ADN has two caches: a request cache and a response cache. The caches are fixed-size and in a form of a circular queue which is overwritten by a queue tail. Each proxy server listens to one or more ports, which are referred to as listening ports in this embodiment. The ingress server listens to a service port, which is open to the public and is provided for connecting a client. For example, port 80 serves HTTP. The transit server and the egress server listen to specific ports which are provided for transmission in the network. For example, the transit server listens to port 65330, and the egress server listens to port 65331. All transit servers are connected back locally using a random source port of less than 65535 when connecting backwards. Each proxy server maintains two connections associated with itself (i.e., connections with the previous node and the next node). The connection may be a TCP (Transmission Control Protocol) connection or a UDP (User Datagram Protocol) connection. When the connection is a UDP connection, the connection may be interpreted as a logical connection. In terms of data stream direction, the connection may include a request direction or a response direction. Each proxy server includes a receiving module and a reporting module, which are respectively configured to receive a breakpoint resuming request and report a resuming response request.

For example, if a first server is abnormally disconnected from a third server, the third server actively closes another connection with a second server, and after the third server actively closes the connection with the second server, the second server may determine that the first server is abnormally disconnected from the third server, thus, the second server neither interrupts the connection with the source station server, nor recycles a request cache and a response cache thereof, but records status information of a transfer cache of the second server and an ingress port, and the second server sends a breakpoint resuming request to the first server, the breakpoint resuming request including the status information of the transfer cache of the second server and the ingress port of the second server.

The status information of the transfer cache of the second server includes a receiving interrupt position of the request cache of the second server, an available starting position of the response cache of the second server, and a sending interrupt position of the response cache of the second server. The ingress port of the second server includes a listening port of the second server.

Step 102, on condition that the first server determines that the resuming condition is satisfied according to the status information of a transfer cache of the first server and the status information of the transfer cache of the second server, the first server sends a breakpoint resuming response to the second server, the breakpoint resuming response including the status information of the transfer cache of the first server and an egress port of the first server.

The status information of the transfer cache of the first server may include a sending interrupt position of the request cache of the first server, an available starting position of the request cache of the first server, and a receiving interrupt position of the response cache of the first server. The egress port of the first server may include a random source port of the first server.

Step 103, on condition that the second server determines that the resuming condition is satisfied according to the status information of the transfer cache of the second server and the status information of the transfer cache of the first server, the second server sends a resumable response message to the first server.

Step 104, in response to the resumable response message, the first server establishes a compensation connection with the second server from the egress port of the first server to the ingress port of the second server.

For example, the first server establishes a connection with the second server from the random source port of the first server to the listening port used by the second server to obtain the compensation connection.

Step 105, the first server and the second server perform resumption through the compensation connection.

In the request direction of data stream, step 105 includes: the first server performing resumption from the receiving interrupt position of the request cache of the second server by using the compensation connection in the request direction; in the response direction of data stream, the second server performing resumption from the receiving interrupt position of the response cache of the first server by using the compensation connection in the response direction.

FIG. 2 is a flow diagram of another method for resuming a transmission link according to an exemplary embodiment. As shown in FIG. 2, the method for resuming a transmission link may further include the following steps.

Step 106, if the third server is disconnected from the second server, the second server receives a breakpoint resuming request sent by the first server, the breakpoint resuming request including the status information of the transfer cache of the first server and the egress port of the first server.

Step 107, on condition that the second server determines that the resuming condition is satisfied according to the status information of the transfer cache of the second server and the status information of the transfer cache of the first server, the second server sends a breakpoint resuming response to the first server, the breakpoint resuming response including the status information of the transfer cache of the second server and the ingress port of the second server.

Step 108, on condition that the first server determines that the resuming condition is satisfied according to the status information of the transfer cache of the first server and the status information of the transfer cache of the second server, the first server sends a resumable response message to the second server.

Step 109, the first server establishes a compensation connection with the second server from the egress port of the first server to the ingress port of the second server.

Step 110, the first server and the second server perform resumption through the compensation connection.

The status information of the transfer cache of the second server and the ingress port of the second server may refer to the content described in step 101. The status information of the transfer cache of the first server and the ingress port of the first server may refer to the content described in step 102.

FIG. 3 is a flow diagram of a method for resuming a transmission link according to an exemplary embodiment. As shown in FIG. 3, the method for resuming a transmission link may further include the following step.

Step 111, the first server determines whether the resuming condition is satisfied according to the status information of the transfer cache of the first server and the status information of the transfer cache of the second server.

In the step 111, the first server first compares the available starting position of the request cache of the first server with the receiving interrupt position of the request cache of the second server.

If the receiving interrupt position of the request cache of the second server is within the range of the available starting position of the request cache of the first server, the first server determines that the resuming condition is satisfied.

If the receiving interrupt position of the request cache of the second server is not within the range of the available starting position of the request cache of the first server, the first server determines that the resuming condition is not satisfied.

For example, in a connection between multiple proxy servers, when the cache capacities in the request direction are progressively decreased (i.e., the request caches of multiple consecutive proxy servers are progressively decreased in the request direction), the receiving interrupt position of the request cache of the second server may be determined to be within the range of the available starting position of the request cache of the first server.

FIG. 4 is a flow diagram of another method for resuming a transmission link according to an exemplary embodiment. As shown in FIG. 4, before step 107, the method for resuming a transmission link may further include the following step.

Step 112, the second server determines whether the resuming condition is satisfied according to the status information of the transfer cache of the second server and the status information of the transfer cache of the first server.

In the step 112, the second server first compares the available starting position of the response cache of the second server with the receiving interrupt position of the response cache of the first server.

If the receiving interrupt position of the response cache of the first server is within the range of the available starting position of the response cache of the second server, the second server determines that the resuming condition is satisfied.

For example, in a connection between multiple proxy servers, when the cache capacities in the response direction are progressively decreased (i.e., the request caches of multiple consecutive proxy servers are progressively decreased in the response direction), the receiving interrupt position of the response cache of the first server may be determined to be within the range of the available starting position of the response cache of the second server.

If the receiving interrupt position of the response cache of the first server is not within the range of the available starting position of the response cache of the second server, the second server determines that the resuming condition is not satisfied.

FIG. 5 is a flow diagram of a method for resuming a transmission link according to another exemplary embodiment. As shown in FIG. 5, the method for resuming a transmission link may further include the following steps.

Step 113, in a case where the first server is an ingress server of the transmission link, if the first server is disconnected from the third server, the first server detects whether the breakpoint resuming request reported by the second server is received within a preset time length.

Step 114, if the breakpoint resuming request is not received within the preset time length, the first server closes the connection between the first server and a client.

Step 115, the request cache and response cache of the first server are recycled.

This shows that, in order to distinguish between an abnormal disconnection and a normally closed connection, the ingress server is conditional on whether a breakpoint resuming request of the egress server is received. If the breakpoint resuming request is not received within a certain timeout period, the connection is confirmed as a normally closed connection, and then the connection between the client and the ingress server is normally closed, and the request cache and the response cache are recycled.

FIG. 6 is a flow diagram of another method for resuming a transmission link according to an exemplary embodiment. As shown in FIG. 6, the method for resuming a transmission link may further include the following steps.

Step 116, in a case where the second server is an egress server of the transmission link, if the connection between the second server and the third server is closed, the second server closes the connection between the second server and a source station server.

Step 117, the request cache and response cache of the second server are recovered.

This shows that, if the connection between the egress server and the transit server is a normally closed, the egress server does not send a compensation connection request to the ingress server, but closes the connection between the egress server and the source station server, and recycles the request cache and response cache of the egress server.

Based on the above, the method can solve the problem that the processing capacity of a single node is not fully utilized in a private network due to the fact that breakpoint resumption can only be completed by a control center, and can compensate and resume the abnormal connection in the transmission link through a node in the private network, so that the idle processing capacity of each node can be utilized, and the utilization rate of processing resources can be improved.

FIG. 7 is a schematic diagram of a method for resuming a transmission link according to an exemplary embodiment. As shown in FIG. 7, in this application scenario, the first server is an ingress server, the second server is an egress server, and the third server is a transit server. When an abnormal connection occurs between the ingress server and the transit server, the specific implementation process of the method for resuming a transmission link is as follows.

The transit server actively closes another connection with the egress server. After receiving the abnormally closed connection with the transit server, the egress server neither recycles the connection with a source station server, nor recycles the request cache and response cache thereof, but records four pieces of information: 1, a receiving interrupt position of the request cache of the egress server; 2, an available starting position of the response cache of the egress server; 3, a sending interrupt position of the response cache of the egress server; and 4, a listening port used by the egress server when the connection is interrupted. Then, the four pieces of information are sent to the receiving module of the previous hop (ingress server) of the transit server through the reporting module of the egress server, while the transit server is skipped. Subsequently, the ingress server closes a random source port, interrupts the abnormal connection with the transit server, but does not close the connection with a client, and nor recycles the request cache and response cache. Instead, four pieces of information are recorded: 1, a sending interrupt position of the request cache of the ingress server; 2, an available starting position of the request cache of the ingress server; 3, a receiving interrupt position of the response cache of the ingress server; and 4, the random source port used by the ingress server.

After receiving the report information from the egress server by the receiving module, the ingress server compares the receiving interrupt position of the request cache of the egress server with the available starting position of the request cache of the ingress server, and if a compensation is available, the ingress server skips the transit server, and sends the four pieces of information to the receiving module of the egress server through a reporting module.

After receiving the information reported by the ingress server by the receiving module, the egress server compares the available starting position of the response cache of the egress server with the receiving interrupt position of the response cache of the ingress server, and if the resuming condition is satisfied, the reporting module of the egress server sends a resumable response message to the receiving module of the ingress server, otherwise sends a non-resumable response to give up resumption.

After receiving the resumable response, the ingress server initiates a new connection to the listening port of the egress server, thereby establishing a compensation connection from the random source port of the ingress server to the listening port of the egress server, and then performing resumption in the request direction from the receiving interrupt position of the request cache of the egress server. After receiving the compensation connection from the ingress server, the egress server performs resumption in the response direction from the receiving interrupt position of the response cache of the ingress server.

In addition, a plurality of transit servers may be provided. For example, in another application scenario, the above three consecutive servers may be three transit servers, that is, the first server may be a transit server 1; the second server may be a transit server 2; and the third server may be a transit server 3. When it is detected that the transit server 1 is abnormally disconnected from the transit server 2, the specific implementation process of the method for resuming a transmission link is the same as the aforementioned implementation flow, and details are not described herein again.

FIG. 8 is a schematic diagram of another method for resuming a transmission link according to an exemplary embodiment. As shown in FIG. 8, in this application scenario, the first server is an ingress server, the second server is an egress server, and the third server is a transit server. When an abnormal connection occurs between the egress server and the transit server, the specific implementation process of the method for resuming a transmission link is as follows.

The transit server actively closes another connection with the ingress server. After receiving the abnormally closed connection with the transit server, the ingress server neither recycles the connection with a client, nor recycles the request cache and response cache thereof, but records four pieces of information: 1, a receiving interrupt position of the request cache of the ingress server; 2, an available starting position of the response cache of the ingress server; 3, a sending interrupt position of the response cache of the ingress server; and 4, a listening port used by the ingress server when the connection is interrupted. Then, the four pieces of information are sent to a receiving module of the previous hop (egress server) of the transit server through a reporting module of the ingress server, while the transit server is skipped. Subsequently, the egress server closes a fixed port and a listening port, interrupts the abnormal connection with the transit server, but does not close the connection with a source station server, and nor recycles the request cache and response cache. Instead, four pieces of information are recorded: 1, a sending interrupt position of the request cache of the egress server; 2, an available starting position of the request cache of the egress server; 3, a receiving interrupt position of the response cache of the egress server; and 4, a random source port used by the egress server.

After receiving the report information from the ingress server by the receiving module, the egress server compares the receiving interrupt position of the request cache of the ingress server with the available starting position of the request cache of the egress server, and if a compensation is available, the egress server skips the transit server and sends the four pieces of information through a reporting module to the receiving module of the ingress server. After receiving the information reported by the egress server by the receiving module, the ingress server compares the available starting position of the response cache of the ingress server with the receiving interrupt position of the response cache of the egress server, and if the resuming condition is satisfied, the reporting module of the ingress server sends a resumable response message to the receiving module of the egress server, otherwise sends a non-resumable response to give up resumption. After receiving the resumable response, the egress server initiates a new connection to the random source port of the ingress server, thereby establishing a compensation connection from the listening port of the egress server to the random source port of the ingress server, and then performing resumption in the request direction from the receiving interrupt position of the request cache of the ingress server. After receiving the compensation connection from the egress server, the ingress server performs resumption in the response direction from the receiving interrupt position of the response cache of the egress server.

FIG. 9 is a schematic diagram of a system for resuming a transmission link according to an exemplary embodiment. As shown in FIG. 9, the system includes a first server, a second server, and a third server between the first server and the second server. The first server, the second server, and the third server are any three consecutive servers in a transmission link.

If the first server is disconnected from the third server, the first server receives a breakpoint resuming request sent by the second server, the breakpoint resuming request including status information of a transfer cache of the second server and an ingress port of the second server;

On condition that the first server determines that the resuming condition is satisfied according to the status information of a transfer cache of the first server and the status information of the transfer cache of the second server, the first server sends a breakpoint resuming response to the second server, the breakpoint resuming response including the status information of the transfer cache of the first server and an egress port of the first server;

On condition that the second server determines that the resuming condition is satisfied according to the status information of the transfer cache of the second server and the status information of the transfer cache of the first server, the second server sends a resumable response message to the first server;

The first server establishes, in response to the resumable response message, a compensation connection with the second server from the egress port of the first server to the ingress port of the second server;

The first server and the second server perform resumption through the compensation connection.

Optionally, if the third server is disconnected from the second server, the second server receives a breakpoint resuming request sent by the first server, the breakpoint resuming request including the status information of the transfer cache of the first server and the egress port of the first server;

on condition that the second server determines that the resuming condition is satisfied according to the status information of the transfer cache of the second server and the status information of the transfer cache of the first server, the second server sends a breakpoint resuming response to the first server, the breakpoint resuming response including the status information of the transfer cache of the second server and the ingress port of the second server;

on condition that the first server determines that the resuming condition is satisfied according to the status information of the transfer cache of the first server and the status information of the transfer cache of the second server, the first server sends a resumable response message to the second server;

the first server establishes a compensation connection with the second server from the egress port of the first server to the ingress port of the second server; and the first server and the second server perform resumption through the compensation connection.

Wherein the status information of the transfer cache of the first server includes a sending interrupt position of the request cache of the first server, an available starting position of the request cache of the first server, and a receiving interrupt position of the response cache of the first server; and the egress port of the first server includes a random source port of the first server.

The status information of the transfer cache of the second server includes a receiving interrupt position of the request cache of the second server, an available starting position of the response cache of the second server, and a sending interrupt position of the response cache of the second server; and the ingress port of the second server includes a listening port of the second server.

Optionally, before the first server determines that the resuming condition is satisfied, the first server is further configured to:

compare the available starting position of the request cache of the first server with the receiving interrupt position of the request cache of the second server; and determine that the resuming condition is satisfied on condition that the receiving interrupt position of the request cache of the second server is within the range of the available starting position of the request cache of the first server; or determine that the resuming condition is not satisfied on condition that the receiving interrupt position of the request cache of the second server is not within the range of the available starting position of the request cache of the first server.

Optionally, before the second server determines that the resuming condition is satisfied, the second server is further configured to:

compare the available starting position of the response cache of the second server with the receiving interrupt position of the response cache of the first server; and on condition that the receiving interrupt position of the response cache of the first server is within the range of the available starting position of the response cache of the second server, determine that the resuming condition is satisfied; or on condition that the receiving interrupt position of the response cache of the first server is not within the range of the available starting position of the response cache of the second server, determine that the resuming condition is not satisfied.

Optionally, the first server is configured to establish a connection with the second server from the random source port of the first server to the listening port used by the second server to obtain the compensation connection.

Optionally, the first server is configured to perform resumption from the receiving interrupt position of the request cache of the second server by using the compensation connection in the request direction.

Optionally, the second server is configured to perform resumption from the receiving interrupt position of the response cache of the first server by using the compensation connection in the response direction.

Optionally, in a case where the first server is an ingress server of the transmission link, if the first server is disconnected from the third server, the first server detects whether the breakpoint resuming request reported by the second server is received within a preset time length;

On the condition that the breakpoint resuming request is not received within the preset time length, the first server closes the connection between the first server and a client; and the first server recycles the request cache and response cache of the first server.

Optionally, in a case where the second server is an egress server of the transmission link, if the connection between the first server and the third server is closed, the second server closes the connection between the second server and a source station server; and the second server recycles the request cache and response cache of the second server.

Based on the above, the system can solve the problem that the processing capacity of a single node is not fully utilized in a private network due to the fact that breakpoint resumption can only be completed by a control center, and can compensate and resume the abnormal connection in the transmission link through a node in the private network, so that the idle processing capacity of each node can be utilized, and the utilization rate of processing resources can be improved.

FIG. 10 is a block diagram of an apparatus for resuming a transmission link according to another exemplary embodiment. The apparatus 300 may be used to execute the method shown in the FIG. 1 or FIG. 2. The apparatus 300 may be implemented as a part or all of a server formed by software, hardware, or a combination of the both, and the server may be the one described in the above application scenario. Referring to FIG. 10, the apparatus 300 may include:

a receiving module 310, configured to receive, if a first server is disconnected from a third server in a transmission link, a breakpoint resuming request sent by a second server, the breakpoint resuming request including status information of a transfer cache of a second server and port information of the second server;

a sending module 320, configured to send a breakpoint resuming response to the second server on the condition that the resuming condition is determined to be satisfied according to the status information of a transfer cache of the first server and the status information of the transfer cache of the second server, the breakpoint resuming response including the status information of the transfer cache of the first server and port information of the first server;

wherein the receiving module 310 is further configured to receive a resumable response message from the second server, the response message being sent when the second server determines that the resuming condition is satisfied according to the status information of the transfer cache of the second server and the status information of the transfer cache of the first server;

a connection establishment module 330, configured to establish a compensation connection between the first server and the second server; and a resuming module 340, configured to perform resumption with the second server through the compensation connection.

Optionally, FIG. 11 is a block diagram of another apparatus for resuming a transmission link according to an exemplary embodiment. When the first server is an upstream node of the second server in the request direction, and a downstream node of the second server in the response direction, the apparatus 300 may be used to execute the method described in FIG. 3.

Wherein the status information of the transfer cache of the first server includes a sending interrupt position of the request cache of the first server, an available starting position of the request cache of the first server, and a receiving interrupt position of the response cache of the first server. The port information of the first server includes a random source port of the first server.

The status information of the transfer cache of the second server includes a receiving interrupt position of the request cache of the second server, an available starting position of the response cache of the second server, and a sending interrupt position of the response cache of the second server. The port information of the second server includes a listening port of the second server.

Referring to FIG. 11, the apparatus 300 may further include a first resuming judgment module 350.

The first resuming judgment module 350 is configured to compare the available starting position of the request cache of the first server with the receiving interrupt position of the request cache of the second server; and determine that the resuming condition is satisfied on condition that the receiving interrupt position of the request cache of the second server is within the range of the available starting position of the request cache of the first server; or determine that the resuming condition is not satisfied on condition that the receiving interrupt position of the request cache of the second server is not within the range of the available starting position of the request cache of the first server.

The connection establishment module 330 is configured to establish a connection with the second server from the random source port of the first server to the listening port used by the second server to obtain the compensation connection.

The resuming module 340 is configured to perform resumption from the receiving interrupt position of the request cache of the second server by using the compensation connection in the request direction.

Optionally, FIG. 12 is a block diagram of another apparatus for resuming a transmission link according to an exemplary embodiment. When the first server is a downstream node of the second server in the request direction, and an upstream node of the second server in the response direction, the apparatus 300 may be used to execute the method described in FIG. 4.

Wherein the status information of the transfer cache of the first server includes a receiving interrupt position of the request cache of the first server, an available starting position of the response cache of the first server, and a sending interrupt position of the response cache of the first server; and the port information of the first server includes a listening port of the first server.

The status information of the transfer cache of the second server includes a sending interrupt position of the request cache of the second server, an available starting position of the request cache of the second server, and a receiving interrupt position of the response cache of the second server; and the port information of the second server includes a random source port of the second server.

Referring to FIG. 12, the apparatus 300 may further include a second resuming judgment module 360, configured to compare, by the first server, the available starting position of the response cache of the first server with the receiving interrupt position of the response cache of the second server; and determine that the resuming condition is satisfied on condition that the receiving interrupt position of the response cache of the second server is within the range of the available starting position of the response cache of the first server; or determine that the resuming condition is not satisfied on condition that the receiving interrupt position of the response cache of the second server is not within the range of the available starting position of the response cache of the first server.

The connection establishment module 330 is configured to establish a connection with the second server from the random source port of the second server to the listening port used by the first server to obtain a compensation connection.

The resuming module 340 is configured to perform resumption from the receiving interrupt position of the response cache of the first server by using the compensation connection in the response direction.

FIG. 13 is a block diagram of an apparatus for resuming a transmission link according to another exemplary embodiment. The apparatus 400 may be used to execute the method shown in the FIG. 1 or FIG. 2. The apparatus 400 may be implemented as a part or all of a server formed by software, hardware, or a combination of the both, and the server may be the one described in the above application scenario. Referring to FIG. 13, the apparatus 400 may include:

a sending module 410, configured to send a breakpoint resuming request to the first server if a first server is disconnected from a third server in a transmission link, the breakpoint resuming request including status information of a transfer cache of a second server and port information of the second server, the third server being a server between the first server and the second server;

wherein the breakpoint resuming request is sent by the second server after the third server actively disconnects from the second server;

a receiving module 420, configured to receive a breakpoint resuming response from the first server, the breakpoint resuming response including status information of a transfer cache of the first server and port information of the first server, wherein the breakpoint resuming response is sent on condition that the first server determines that the resuming condition is satisfied according to the status information of the transfer cache of the first server and the status information of the transfer cache of the second server;

the sending module 410 is further configured to send a resumable response message to the second server on condition that the resuming condition is determined to be satisfied according to the status information of the transfer cache of the second server and the status information of the transfer cache of the first server;

a connection establishment module 430, configured to establish a compensation connection between the first server and the second server; and a resuming module 440, configured to perform resumption with the second server through the compensation connection.

Optionally, FIG. 14 is a block diagram of another apparatus for resuming a transmission link according to an exemplary embodiment. When the first server is an upstream node of the second server in the request direction, and a downstream node of the second server in the response direction, the apparatus 400 may be used to execute the method described in FIG. 3.

Wherein the status information of the transfer cache of the first server includes a sending interrupt position of the request cache of the first server, an available starting position of the request cache of the first server, and a receiving interrupt position of the response cache of the first server.

The port information of the first server includes a random source port of the first server.

The status information of the transfer cache of the second server includes a receiving interrupt position of the request cache of the second server, an available starting position of the response cache of the second server, and a sending interrupt position of the response cache of the second server.

The port information of the second server includes a listening port of the second server.

Referring to FIG. 14, the apparatus 400 may further include a first resuming judgment module 450.

The first resuming judgment module 450 is configured to compare the available starting position of the request cache of the first server with the receiving interrupt position of the request cache of the second server; and determine that the resuming condition is satisfied on condition that the receiving interrupt position of the request cache of the second server is within the range of the available starting position of the request cache of the first server; or determine that the resuming condition is not satisfied on condition that the receiving interrupt position of the request cache of the second server is not within the range of the available starting position of the request cache of the first server.

The connection establishment module 430 is configured to establish a connection with the second server from the random source port of the first server to the listening port used by the second server to obtain the compensation connection.

The resuming module 440 is configured to perform resumption from the receiving interrupt position of the request cache of the second server by using the compensation connection in the request direction.

Optionally, FIG. 15 is a block diagram of another apparatus for resuming a transmission link according to an exemplary embodiment. When the first server is a downstream node of the second server in the request direction, and the first server is an upstream node of the second server in the response direction, the apparatus 400 may be used to execute the method described in FIG. 4.

Wherein the status information of the transfer cache of the first server includes a receiving interrupt position of the request cache of the first server, an available starting position of the response cache of the first server, and a sending interrupt position of the response cache of the first server; and the port information of the first server includes a listening port of the first server.

The status information of the transfer cache of the second server includes a sending interrupt position of the request cache of the second server, an available starting position of the request cache of the second server, and a receiving interrupt position of the response cache of the second server; and the port information of the second server includes a random source port of the second server.

Referring to FIG. 15, the apparatus 400 may further include a second resuming judgment module 460, configured to compare the available starting position of the response cache of the first server with the receiving interrupt position of the response cache of the second server; and determine that the resuming condition is satisfied on condition that the receiving interrupt position of the response cache of the second server is within the range of the available starting position of the response cache of the first server; or determine that the resuming condition is not satisfied on condition that the receiving interrupt position of the response cache of the second server is not within the range of the available starting position of the response cache of the first server.

The connection establishment module 430 is configured to establish a connection with the second server from the random source port of the second server to the listening port used by the first server to obtain a compensation connection.

The resuming module 440 is configured to perform resumption from the receiving interrupt position of the response cache of the first server by using the compensation connection in the response direction.

Based on the above, the apparatus can solve the problem that the processing capacity of a single node is not fully utilized in a private network due to the fact that breakpoint resumption can only be completed by a control center, and can compensate and resume the abnormal connection in the transmission link through a node in the private network, so that the idle processing capacity of each node can be utilized, and the utilization rate of processing resources can be improved.

In addition, the present disclosure also provides a computer program product, the computer program product including computer programs executable by a programmable apparatus, the computer programs having a code part for the method for resuming a transmission link when being executed by the programmable apparatus.

The present disclosure also provides a non-transitory computer readable storage medium, including one or more programs for executing the methods for resuming a transmission link.

The present disclosure also provides an electronic device, the electronic device including the non-transitory computer readable storage medium and one or more processors for executing the programs in the non-transitory computer readable storage medium.

FIG. 16 is a block diagram of another apparatus for resuming a transmission link according to an embodiment of the present disclosure. The apparatus 1600 may be a terminal device. As shown in FIG. 16, the apparatus 1600 may include a processor 1601, a memory 1602, a multimedia component 1603, an input/output (I/O) interface 1604, and a communication component 1605.

Wherein the processor 1601 is configured to control the overall operation of the apparatus 1600 to complete all of or part of steps of the method shown in any one of FIG. 1 to FIG. 6. The memory 1602 is configured to store various types of data to support operations at the apparatus 1600. The data may include, for example, instructions of any application or method operated on the apparatus 1600, as well as application related data, such as contact data, received and transmitted messages, pictures, audio and video. The memory 1602 may be implemented by any type of volatile or non-volatile storage terminal device or a combination thereof, such as a Static Random Access Memory (SRAM), an Electrically Erasable Programmable Read-Only Memory (EEPROM), an Erasable Programmable Read-Only Memory (EPROM), a Programmable Read-Only Memory (PROM), a Read-Only Memory (ROM), a magnetic memory, a flash memory, a magnetic disk or an optical disk. The multimedia component 1603 may include a screen and an audio component. The screen may be, for example, a touch screen, and the audio component is configured to output and/or input audio signals. For example, the audio component may include a microphone for receiving external audio signals. The received audio signals may be further stored in the memory 1602 or sent by the communication component 1605. The audio component further includes at least one speaker for outputting audio signals. The I/O interface 1604 provides an interface between the processor 1601 and other interface module which may be a keyboard, a mouse, buttons, or the like. These buttons may be virtual buttons or physical buttons. The communication component 1605 is used for wired or wireless communication between the apparatus 1600 and other terminal device. The wireless communication is such as Wi-Fi, Bluetooth, Near Field Communication (NFC), 2G, 3G or 4G, or a combination of one or more of them, and the corresponding communication component 1605 may include a Wi-Fi module, a Bluetooth module, or an NFC module.

In an exemplary embodiment, the apparatus 1600 may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), controllers, microcontrollers, microprocessors or other electronic components to execute the method for resuming a transmission link.

In another exemplary embodiment, a non-transitory computer readable storage medium including instructions is further provided, such as a memory 1602 including instructions executable by the processor 1601 of the apparatus 1600 to complete the method for resuming the transmission link. Exemplarily, the non-transitory computer readable storage medium may be an ROM, a Random Access Memory (RAM), a CD-ROM, a magnetic tape, a floppy disk, or an optical data storage device, etc.

FIG. 17 is a block diagram of another apparatus for resuming a transmission link according to an embodiment of the present disclosure. The apparatus 1700 may be a server, a server cluster composed of a plurality of servers, or a cloud computing service center. Referring to FIG. 17, the apparatus 1700 includes a processor 1701, a memory 1702, an I/O interface 1703, and a network interface 1704, wherein the memory 1702 may be configured to store instructions executable by the processor 1701, and the processor 1701 may execute these instructions to execute the method for resuming a transmission link. In addition, the apparatus 1700 may be operated on the basis of an operating system stored in the memory 1702, and the operating system includes, but is not limited to, Windows Server™, Mac OS X™, Unix™, Linux™, FreeBSD™, etc.

The preferred embodiments of the present disclosure have been described in detail above with reference to the accompanying drawings. However, the present disclosure is not limited to the specific details in the above embodiments. Various simple variations may be made to the technical solutions of the present disclosure within the scope of the technical idea of the present disclosure, and these simple variations shall fall within the scope of the present disclosure.

It should be further noted that the specific technical features described in the above specific embodiments may be combined in any suitable manner without contradiction. In order to avoid unnecessary repetition, the present disclosure will not describe various possible combinations.

Moreover, the various different embodiments of the present disclosure may be combined randomly without deviating from the idea of the present disclosure, and the combinations should also be regarded as the disclosure of the present disclosure.

The invention claimed is:

1. A method for resuming a transmission link, comprising:
a first server receiving a breakpoint-resuming-request-sent-by-a-second-server if the first server is disconnected from a third server in the transmission link, the breakpoint-resuming-request-sent-by-a-second-server including status information of a transfer cache of the second server and an ingress port of the second server, the third server being a server between the first server and the second server;
the first server sending a breakpoint-resuming-response-to-the-second-server on condition that the first server determines that a resuming condition is satisfied according to the status information of a transfer cache of the first server and the status information of the transfer cache of the second server, the breakpoint-resuming-response-to-the-second-server including the status information of the transfer cache of the first server and an egress port of the first server;
the second server sending a resumable response message to the first server on condition that the second server determines that the resuming condition is satisfied according to the status information of the transfer cache of the second server and the status information of the transfer cache of the first server;
wherein the first server determining that the resuming condition is satisfied on is within the range of the available-starting-position-of-the-request-cache-of-the-first-server;
the first server establishing a compensation connection with the second server from the egress port of the first server to the ingress port of the second server in response to the resumable response message, wherein the compensation connection compensates and resumes an abnormal connection in the transmission link; and
the first server and the second server performing resumption through the compensation connection;
wherein the first server, the second server, and the third server are any three consecutive servers in a transmission link in an application delivery network between a client and a source station server, and the first server, the second server and the third server are nodes of the application delivery network, wherein the third server is between the first server and the second server.

2. The method according to claim 1, further comprising:
the second server receiving a breakpoint-resuming-request-sent-by-the-first-server if the third server is disconnected from the second server, the breakpoint-resuming-request-sent-by-the-first-server including the status information of the transfer cache of the first server and the egress port of the first server;
the second server sending a breakpoint-resuming-response-to-the-first-server on condition that the second server determines that the resuming condition is satisfied according to the status information of the transfer cache of the second server and the status information of the transfer cache of the first server, the breakpoint-resuming-response-to-the-first-server including the status information of the transfer cache of the second server and the ingress port of the second server;
the first server sending a resumable response message to the second server on condition that the first server determines that the resuming condition is satisfied according to the status information of the transfer cache of the first server and the status information of the transfer cache of the second server;
the first server establishing a compensation connection with the second server from the egress port of the first server to the ingress port of the second server; and
the first server and the second server performing resumption through the compensation connection.

3. The method according to claim 1, wherein the status information of the transfer cache of the first server comprises a sending-interrupt-position-of-a-request-cache-of-the-first-server, an available-starting-position-of-the-request-cache-of-the-first-server, and a receiving-interrupt-position-of-a-response-cache-of-the-first-server;
the egress port of the first server comprises a random source port of the first server;
the status information of the transfer cache of the second server comprises a receiving-interrupt-position-of-a-request-cache-of-the-second-server, an available-starting-position-of-a-response-cache-of-the-second-server, and a sending-interrupt-position-of-the-response-cache-of-the-second-server; and
the ingress port of the second server comprises a listening port of the second server.

4. The method according to claim 3, wherein before the first server determines that the resuming condition is satisfied, the method further comprises;
the first server comparing the available-starting-position-of-tire-request-cache-of-the-first-server with the receiving-interrupt-position-of-a-request-cache-of-the-second-server; and
the first server determining that the resuming condition is not satisfied on condition that the receiving-interrupt-position-of-a-request-cache-of-the-second-server is not within the range of the available-starting-position-of-the-request-cache-of-the-first-server.

5. The method according to claim 3, wherein before the second server determines that the resuming condition is satisfied, the method further comprises:
the second server comparing the available-starting-position-of-the-response-cache-of-the-second-server with the receiving-interrupt-position-of-a-response-cache-of-the-first-server; and
the second server determining that the resuming condition is satisfied on condition that the receiving-interrupt-position-of-a-response-cache-of-the-first-server is within the range of the available-starting-position-of-the-response-cache-of-the-second-server; or
the second server determining that the resuming condition is not satisfied on condition that the receiving-interrupt-position-of-a-response-cache-of-the-first-server is not within the range of the available-starting-position-of-the-response-cache-of-the-second-server.

6. The method according to claim 3, wherein the first server establishing the compensation connection with the second server from the egress port of the first server to the ingress port of the second server comprises:
the first server establishing a connection with the second server from the random source port of the first server to the listening port used by the second server to obtain the compensation connection.

7. The method according to claim 6, wherein the first server and the second server performing resumption through the compensation connection comprises:

the first server performing resumption from the receiving-interrupt-position-of-a-request-cache-of-the-second-server by using the compensation connection in the request direction; and the second server performing resumption from the receiving-interrupt-position-of-a-response-cache-of-the-first-server by using the compensation connection in the response direction.

8. The method according to claim 1, further comprising:

the first server detecting whether the breakpoint resuming request reported by the second server is received within a preset time length if the second server is disconnected from the third server in a case where the first server is an ingress server of the transmission link;

the first server closing a connection between the first server and a client if the breakpoint resuming request reported by the second server is not received within the preset time length; and recycling the request cache and response cache of the first server.

9. The method according to claim 1, further comprising:

the second server closing a connection between the second server and a source station server in a case where the second server is an egress server of the transmission link, if the connection between the second server and the third server is actively closed; and recycling the request cache and response cache of the second server.

10. A system for resuming a transmission link, comprising:

a first server, a second server, and a third server between the first server and the second server, wherein the first server, the second server, and the third server are any three consecutive servers in a transmission link in an application delivery network between a client and a source station server, and the first server, the second server and the third server are nodes of the application delivery network;

the first server is configured to receive a breakpoint-resuming-request-sent-by-the-second-server if the first server is disconnected from the third server, the breakpoint-resuming-request-sent-by-the-second-server including status information of a transfer cache of the second server and an ingress port of the second server;

the first server is configured to send a breakpoint-resuming-response-to-the-second-server on condition that the first server determines that a resuming condition is satisfied according to the status information of a transfer cache of the first server and the status information of the transfer cache of the second server, the breakpoint-resuming-response-to-the-second-server including the status information of the transfer cache of the first server and an egress port of the first server;

the second server is configured to send a resumable response message to the first server on condition that the second server determines that the resuming condition is satisfied according to the status information of the transfer cache of the second server and the status information of the transfer cache of the first server;

wherein the first server determining that the resuming condition is satisfied on condition that the receiving-interrupt-position-of-the-request-cache-of-the-second-server is within the range of the available-starting-position-of-the-request-cache-of-the-first-server;

the first server is configured to establish, in response to the resumable response message, a compensation connection with the second server from the egress port of the first server to the ingress port of the second server, wherein the compensation connection compensates and resumes an abnormal connection in the transmission link; and the first server and the second server are configured to perform resumption through the compensation connection.

11. The system according to claim 10, wherein the second server is configured to receive a breakpoint-resuming-request-sent-by-the-first-server if the third server is disconnected from the second server, the breakpoint-resuming-request-sent-by-the-first-server including the status information of the transfer cache of the first server and the egress port of the first server;

the second server is configured to send a breakpoint-resuming-response-to-the-first-server on condition that the second server determines that the resuming condition is satisfied according to the status information of the transfer cache of the second server and the status information of the transfer cache of the first server, the breakpoint-resuming-response-to-the-first-server including the status information of the transfer cache of the second server and the ingress port of the second server;

the first server is configured to send a resumable response message to the second server on condition that the first server determines that the resuming condition is satisfied according to the status information of the transfer cache of the first server and the status information of the transfer cache of the second server;

the first server is configured to establish a compensation connection with the second server from the egress port of the first server to the ingress port of the second server; and the first server and the second server are configured to perform resumption through the compensation connection.

12. The system according to claim 10, wherein the status information of the transfer cache of the first server comprises a sending-interrupt-position-of-a-request-cache-of-the-first-server, an available-starting-position-of-the-request-cache-of-the-first-server, and a receiving-interrupt-position-of-a-response-cache-of-the-first-server;

the egress port of the first server comprises a random source port of the first server;

the status information of the transfer cache of the second server comprises a receiving-interrupt-position-of-a-request-cache-of-the-second-server, an available-starting-position-of-a-response-cache-of-the-second-server, and a sending-interrupt-position-of-the-response-cache-of-the-second-server; and the ingress port of the second server comprises a listening port of the second server.

13. The system according to claim 12, wherein before the first server determines that the resuming condition is satisfied, the first server is further configured to:

compare the available-starting-position-of-the-request-cache-of-the-first-server with the receiving-interrupt-position-of-a-request-cache-of-the-second-server; and determine that the resuming condition is satisfied on condition that the receiving-interrupt-position-of-a-request-cache-of-the-second-server is within the range of the available-starting-position-of-the-request-cache-of-the-first-server; or determine that the resuming condition is not satisfied on condition that the receiving-interrupt-position-of-a-request-cache-of-the-second-server is not within the range of the available-starting-position-of-the-request-cache-of-the-first-server.

14. The system according to claim 12, wherein before the second server determines that the resuming condition is satisfied, the second server is further configured to:
    compare the available-starting-position-of-the-response-cache-of-the-second-server with the reeeiving-interrupt-position-ef-a-respense-cache-of-the-first-server; and
    determine that the resuming condition is not satisfied on condition that the receiving-interrupt-position-of-a-response-cache-of-Lhe-first-server is not within the range of the available-starting-position-of-the-response-cache-of-the-second-server.

15. The system according to claim 12, wherein the first server is configured to establish a connection with the second server from the random source port of the first server to the listening port used by the second server to obtain the compensation connection.

16. The system according to claim 15, wherein the first server is configured to perform resumption from the receiving-interrupt-position-of-a-request-cache-of-the-second-server by using the compensation connection in the request direction; and
    the second server is configured to perform resumption from the receiving-interrupt-position-of-a-response-cache-of-the-first-server by using the compensation connection in the response direction.

17. The system according to claim 10, wherein the first server is configured to detect whether the breakpoint resuming request reported by the second server is received within a preset time length in a case where the first server is an ingress server of the transmission link, if the first server is disconnected from the third server;
    the first server is configured to close the connection between the first server and the client on condition that the breakpoint resuming request reported by the second server is not received within the preset time length; and
    the first server is configured to recycle the request cache and response cache of the first server.

18. The system according to claim 10, wherein the second server is configured to close a connection between the second server and a source station server in a case where the second server is an egress server of the transmission link, on condition that a connection between the first server and the third server is closed; and
    the second server is configured to recycle the request cache and response cache of the second server.

19. An apparatus for resuming a transmission link, applied to a first server, wherein the first server, a second server, and a third server are any three consecutive servers in a transmission link in an application delivery network between a client and a source station server, and the first server, the second server and the third server are nodes of the application delivery network, the third server is between the first server and the second server, the apparatus comprising:
    a receiving module, configured to receive, if the first server is disconnected from a third server in a transmission link, a breakpoint-resuming-request-sent-by-the-second-server, the breakpoint-resuming-request-sent-by-the-second-server including status information of a transfer cache of the second server and port information of the second server, the third server being a server between the first server and the second server;
    a sending module, configured to send, on condition that a resuming condition is determined to be satisfied according to the status information of a transfer cache of the first server and the status information of the transfer cache of the second server, a breakpoint-resuming-response-to-the-second-server, the breakpoint-resuming-response-to-the-second-server including the status information of the transfer cache of the first server and port information of the first server;
    wherein the receiving module is further configured to receive a resumable response message from the second server, the response message being sent on condition that the second server determines that the resuming condition is satisfied according to the status information of the transfer cache of the second server and the status information of the transfer cache of the first server;
    wherein the first server determining that the resuming condition is satisfied on condition that the receiving-interrupt-position-of-the-request-cache-of-the-second-server server;
    a connection establishment module, configured to establish a compensation connection between the first server and the second server, wherein the compensation connection compensates and resumes an abnormal connection in the transmission link; and
    a resuming module, configured to perform resumption with the second server through the compensation connection.

20. The apparatus according to claim 19, wherein the first server is an upstream node of the second server in the request direction, and a downstream node of the second server in the response direction;
    the status information of the transfer cache of the first server comprises a sending-interrupt-position-of-a-request-cache-of-the-first-server, an available-starting-position-of-the-request-cache-of-the-first-server, and a receiving-interrupt-position-of-a-response-cache-of-the-first-server;
    the port information of the first server comprises a random source port of the first server;
    the status information of the transfer cache of the second server comprises a receiving-interrupt-position-of-a-request-cache-of-the-second-server, an available-starting-position-of-a-response-cache-of-the-second-server, and a sending-interrupt-position-of-the-response-cache-of-the-second-server; and
    the port information of the second server comprises a listening port of the second server.

* * * * *